US012630446B1

(12) United States Patent
Omran et al.

(10) Patent No.: US 12,630,446 B1
(45) Date of Patent: May 19, 2026

(54) COBALT OXIDE/CALCIUM SILICATE@GRAPHITIC CARBON NITRIDE (CoO/CaSi03@G-C3N4) NANOCOMPOSITE AS AN EFFECTIVE ADSORBENT

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/264,537

(22) Filed: Jul. 9, 2025

(51) Int. Cl.
| | |
|---|---|
| *C02F 1/28* | (2023.01) |
| *B01J 20/02* | (2006.01) |
| *B01J 21/16* | (2006.01) |
| *B01J 27/24* | (2006.01) |
| *B01J 35/45* | (2024.01) |

(Continued)

(52) U.S. Cl.
CPC .......... *C02F 1/288* (2013.01); *B01J 20/0225* (2013.01); *B01J 21/16* (2013.01); *B01J 27/24* (2013.01); *B01J 35/45* (2024.01); *B01J 35/613* (2024.01); *B01J 35/633* (2024.01); *B01J 35/647* (2024.01);

(Continued)

(58) Field of Classification Search
CPC ... C02F 1/288; C02F 2101/30; B01J 20/0225; B01J 21/16; B01J 27/24; B01J 35/45; B01J 35/613; B01J 35/633; B01J 35/647; B01J 35/77; B82Y 30/00
See application file for complete search history.

(56) References Cited

FOREIGN PATENT DOCUMENTS

| | | | | |
|---|---|---|---|---|
| CN | 111672454 A | * | 9/2020 | ............ B01J 20/205 |
| CN | 111672454 B | | 7/2021 | |

(Continued)

OTHER PUBLICATIONS

Mechanistic Understanding of Superior Methylene Blue Adsorption Capacity in a Novel g-C3N4 Modified Amorphous Na—Ca—Mg Silicate Adsorbent: Insights from Multinuclear Solid-State NMR Spectroscopy ('Soyer-Uzun', J.Phys.Chem. B2024, 128, 12638-12650) (Year: 2024).*

(Continued)

*Primary Examiner* — Bobby Ramdhanie
*Assistant Examiner* — Boi-Lien Thi Nguyen
(74) *Attorney, Agent, or Firm* — Oblon, McClelland, Maier & Neustadt, L.L.P.

(57) ABSTRACT

A method of water purification includes mixing contaminated water consisting of one or more pollutants with a CoO/CaSiO$_3$@g-C$_3$N$_4$ nanocomposite material, adsorbing at least a portion of the one or more pollutants from the contaminated water, and further removing the nanocomposite material using filtration to form purified water. The nanocomposite material includes hexagonal metal oxide nanoparticles consisting of a CoO phase and a CaSiO$_3$ phase dispersed on a matrix of g-C$_3$N$_4$ nanosheets where the hexagonal metal oxide nanoparticles have an average particle diameter in a range from 340 to 440 nanometer (nm) and the nanocomposite material has an absorption capacity for basic fuchsin of at least 20 milligram per gram (mg/g).

18 Claims, 7 Drawing Sheets

(51) Int. Cl.

| | |
|---|---|
| *B01J 35/61* | (2024.01) |
| *B01J 35/63* | (2024.01) |
| *B01J 35/64* | (2024.01) |
| *B01J 35/77* | (2024.01) |
| *B82Y 30/00* | (2011.01) |
| *C02F 101/30* | (2006.01) |

(52) U.S. Cl.
CPC .............. *B01J 35/77* (2024.01); *B82Y 30/00* (2013.01); *C02F 2101/30* (2013.01)

(56) References Cited

FOREIGN PATENT DOCUMENTS

| | | | | |
|---|---|---|---|---|
| CN | 116159556 | A | 5/2023 | |
| CN | 116493033 | A | * 7/2023 | ................ C02F 1/30 |

OTHER PUBLICATIONS

Revolutionizing dye removal: g-C3N4-Modified ZnO nanocomposite for exceptional adsorption of basic fuchsin dye ('Khezami', Inorganic Chemistry Communications 164 (2024) 112413) (Year: 2024).*

Uptake of BF Dye from the Aqueous Phase by CaO-g-C3N4 Nanosorbent: Construction, Descriptions, and Recyclability ('Said', Inorganics 2023, 11(1), 44) (Year: 2023).*

Cobalt oxide loaded graphitic carbon nitride as adsorptive photocatalyst for tetracycline removal from aqueous solution ('Niu', Chemosphere 218 (2019) 169-178) (Year: 2019).*

A novel magnetic calcium silicate/graphene oxide composite material for selective adsorption of acridine orange from aqueous solutions ('Wang', RSC Adv., 2016, 6, 34770) (Year: 2016).*

Activation of persulfate by CoO nanoparticles loaded on 3D mesoporous carbon nitride (CoO@meso-CN) for the degradation of methylene blue (MB) ('Nguyen', Science of the Total Environment 675 (2019) 531-541) (Year: 2019).*

Cobalt oxide particles embedded in carbon nitride nanosheets for enhanced photocatalytic performance ('Lu', Solar Energy 292 (2025) 113424) (Year: 2025).*

Lotfi Khezami, et al., "Revolutionizing dye removal: g-C3N4-Modified ZnO nanocomposite for exceptional adsorption of basic fuchsin dye", Inorganic Chemistry Communications, vol. 164, Jun. 2024, 112413, Excerpts only, 11 pages.

Abueliz Modwi, et al., "Excellent Adsorption of Dyes via MgTiO3@g-C3N4 Nanohybrid: Construction, Description and Adsorption Mechanism", Inorganics 2022, vol. 10, Nov. 15, 2022, 14 pages.

* cited by examiner $$y = 1.0964x + 53.737$$
$$R^2 = 0.6501$$

COBALT OXIDE/CALCIUM SILICATE@GRAPHITIC CARBON NITRIDE (CoO/CaSi03@G-C3N4) NANOCOMPOSITE AS AN EFFECTIVE ADSORBENT

BACKGROUND

Technical Field

The present disclosure is directed to a nanocomposite, and more particularly, a nanocomposite consisting of cobalt oxide (CoO), calcium silicate ($CaSiO_3$) and graphitic carbon nitride (g-$C_3N_4$) as an effective adsorbent for wastewater treatment.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Heavy metal contamination has emerged as an urgent environmental issue due to the toxic, carcinogenic and non-biodegradable nature of metal ions such as copper ($Cu^{2+}$), cadmium ($Cd^{2+}$), lead ($Pb^{2+}$) and chromium ($Cr^{6+}$). These pollutants originate from industrial activities like electroplating, mining, textiles and battery manufacturing and poses serious threats to ecosystems and human health. These metals are not only toxic and carcinogenic but also non-biodegradable in nature making them particularly hazardous when discharged untreated into water bodies. Their ability to enter food chains can lead to severe health issues including cancer, neurological damage, and kidney failure. As a result, effective removal of these contaminants must be achieved for environmental protection and human health.

Among various remediation strategies, adsorption has gained considerable attention due to its simplicity, cost-effectiveness, and efficiency at trace-level contaminant removal (Sing, D., et al., Citric acid coated magnetic nanoparticles: synthesis, characterization and application in removal of Cd (II) ions from aqueous solution, *Journal of Water Process Engineering*, 2014, 4, 233-241). In this context, graphitic carbon nitride (g-$C_3N_4$) has emerged as a promising metal-free adsorbent and photocatalyst. It offers numerous advantages such as chemical and thermal stability, visible light activity and ease of synthesis. However, its practical application is often limited by a relatively low surface area and fast recombination of photogenerated charge carriers.

To overcome these shortcomings, researchers have explored heteroatom doping, microstructure modifications and the incorporation of metal or metal oxide nanoparticles with g-$C_3N_4$ nanosheets. Notable examples include $MgY_2O_4$-g-$C_3N_4$, $O_x$-g-$C_3N_4$/Pani-NF, and $CoFe_2O_4$-g-$C_3N_4$ for copper ion removal, as well as CdS/g-$C_3N_4$, $Y_2O_3$@g-$C_3N_4$, and ZnO-g-$C_3N_4$ for cadmium ion exclusion (Sharma, D., et al., In-situ synthesis of ZnO modified g-$C_3N_4$ composite: a potential photocatalyst and adsorbent for wastewater remediation, *Materials research innovations*, 2022, 26, 2, 65-75), (Li, D., et al., Electrochemical hydrogen evolution reaction efficiently catalyzed by Ru—N coupling in defect-rich Ru/g-$C_3$ $N_4$ nanosheets, *Journal of Materials Chemistry A*, 2021, 9, 26, 15019-15026).

Accordingly, one object of the present disclosure is to provide a nanocomposite material that addresses these limitations by enhancing adsorption capacity, photocatalytic efficiency, and stability under real-world conditions.

SUMMARY

In an exemplary embodiment, a method of water purification is described. The method includes mixing contaminated water consisting of one or more pollutants with a cobalt oxide/calcium silicate/graphitic carbon nitride (CoO/CaSiO$_3$@g-$C_3N_4$) nanocomposite material and adsorbing at least a portion of the one or more pollutants from the contaminated water and further removing the nanocomposite material using filtration to form purified water. The nanocomposite material includes hexagonal metal oxide nanoparticles consisting of a CoO phase and a $CaSiO_3$ phase dispersed on a matrix of g-$C_3N_4$ nanosheets where the hexagonal metal oxide nanoparticles have an average particle diameter in a range from 340 to 440 nanometer (nm) and the nanocomposite material has an absorption capacity for basic fuchsin (BF) of at least 20 milligram per gram (mg/g).

In some embodiments, the nanocomposite material has an absorption capacity for BF of at least 25 mg/g.

In some embodiments, the nanocomposite material has an absorption capacity for BF of at least 30 mg/g.

In some embodiments, the nanocomposite material has an absorption capacity for BF of at least 35 mg/g.

In some embodiments, the nanocomposite material has an absorption capacity for BF of at least 40 mg/g.

In some embodiments, the nanocomposite material has an absorption capacity for BF of 40.8 mg/g.

In some embodiments, the hexagonal metal oxide nanoparticles have an average particle diameter in a range from 370-410 nm.

In some embodiments, the hexagonal metal oxide nanoparticles have an average particle diameter in a range from 380-400 nm.

In some embodiments, the hexagonal metal oxide nanoparticles have an average particle diameter in a range from 382-395 nm.

In some embodiments, the CoO/CaSiO$_3$@g-$C_3N_4$ nanocomposite material has a mass ratio of CoO:CaSiO$_3$:g-$C_3N_4$ phases in a range from 0.25-10:0.25-10:0.25-10.

In some embodiments, the nanocomposite material has a Brunauer-Emmett-Teller (BET) surface area of at least 20 square meters per gram ($m^2 \cdot g^{-1}$).

In some embodiments, the nanocomposite material has a BET surface area of at least 25 $m^2 \cdot g^{-1}$.

In some embodiments, the nanocomposite material has a BET surface area of at least 30 $m^2 \cdot g^{-1}$.

In some embodiments, the nanocomposite material has a BET surface area of 30.68 $m^2 \cdot g^{-1}$.

In some embodiments, the nanocomposite material has a pore volume of at least 0.10 cubic centimeters per gram ($cm^3 \cdot g^{-1}$).

In some embodiments, the nanocomposite material has a pore volume of at least 0.15 $cm^3 \cdot g^{-1}$.

In some embodiments, the nanocomposite material has a pore volume of at least 0.195 $cm^3 \cdot g^{-1}$.

In some embodiments, the nanocomposite material has an average pore diameter in a range from 10-30 nm.

In some embodiments, the nanocomposite material has an average pore diameter in a range from 15-27 nm.

In some embodiments, the nanocomposite material has an average pore diameter of 21.82 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
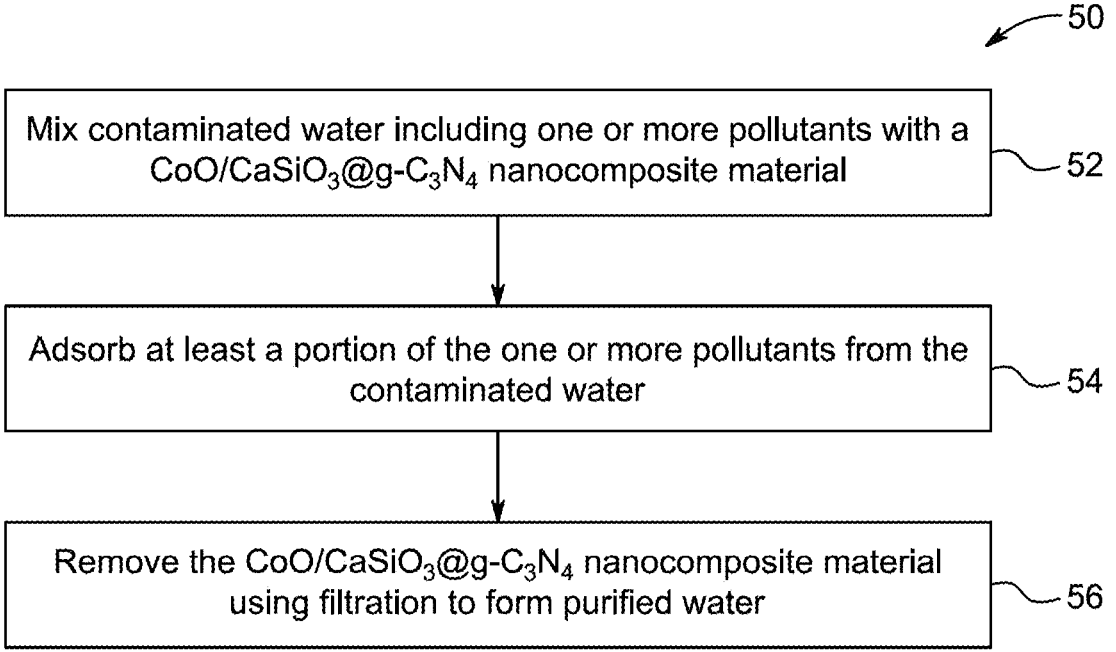
FIG. 1 shows a flowchart depicting a method of water purification, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "room temperature" refers to a temperature range of 25 degrees Celsius (° C.)±3° C. in the present disclosure.

As used herein, the term "nanoparticles (NPs)" refers to particles having a particle size of 1 nm to 1000 nanometer (nm) within the scope of the present disclosure. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

As used herein, the term "nanocomposite" refers to a composite material in which at least one dimension of the component is in the nanometer size scale (<1000 nm). The nanocomposites are poly-phase solid materials made up of one or more nanomaterials. The term includes all types of multiphase solid materials in which one of the phases has one, two, or three dimensions of less than 1000 nm, or structures having nanoscale repeat distances between the different phases that make up the material.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and 18O. Isotopically labeled compounds of the disclosure may generally be prepared by conventional techniques known to those skilled in the art or by processes analogous to those described herein, using an appropriate isotopically labeled reagent in place of the non-labeled reagent otherwise employed.

As used herein, the term "organic contaminants" refers to carbon-based compounds, typically derived from industrial, agricultural, or domestic activities, that are present as contaminants in water or the environment. These contaminants may include pesticides, pharmaceuticals, dyes and other synthetic or natural organic substances that can pose environmental or health risks.

As used herein the term "XRD" refers to X-ray diffraction, a scientific technique used to study the structure of materials. It is commonly used to identify the crystalline phases of a substance, crystal structure and to analyze the arrangement of atoms within a material.

As used herein, the term "BET" refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term "surface area" refers to the total area of the surface of a material that is available for interaction with its environment. It is a measure of the extent of a materials' surface exposed to external conditions, which can be crucial in determining the materials' reactivity, adsorption capacity, or other surface-related properties.

As used herein, the term "porosity" refers to a measure of the void or vacant spaces within a material.

As used herein, the term "pore diameter" refers to an average width or size of the pores (void spaces) within a material, typically measured in nm or angstroms (Å). It is a useful parameter in characterizing the texture and permeability of porous materials, influencing their adsorption, filtration, or catalytic properties.

As used herein, the term "pore volume" refers to the total volume of void spaces (pores) within a material that is capable of being filled by a gas or liquid. It is typically expressed in cubic centimeters per gram ($cm^3/g$) and is a useful parameter in characterizing the porous structure of materials, such as adsorbents or catalysts.

As used herein the term "Barrett-Joyner-Halenda (BJH)" method is a method used to analyze pore size distribution in porous materials, typically from nitrogen adsorption-desorption isotherms. The BJH method is useful for characterizing mesoporous materials (with pore sizes between 2 and 50 nm).

As used herein, the term "mesoporous" refers to a type of material that contains pores (voids or spaces) with diameters typically ranging from 2 to 50 nm. These pores are intermediate in size between micropores (less than 2 nm) and macropores (greater than 50 nm).

As used herein, the term "Transmission electron microscopy (TEM)" refers to a microscopy technique that utilizes a beam of electrons transmitted through a thin sample to form an image. TEM provides high-resolution imaging at the nanometer or even atomic scale, allowing the observation of the internal structure of materials. This method is widely used to examine the morphology, crystallography, and composition of nanoparticles, materials, and biological specimens, offering detailed insights into their microstructure.

As used herein, the term "adsorption" refers to the process by which pollutant molecules adhere to the surface of a nanocomposite material through physical or chemical interactions. This process occurs at the interface between the nanocomposite and the surrounding environment, typically a liquid or gas containing the pollutant. The high surface area, porous structure, and functional surface groups of the nanocomposite enhances its ability to attract and retain pollutant molecules, making it an effective material for environmental remediation applications.

As used herein, the term "adsorbate" refers to the chemical species such as atoms, ions, molecules or complexes that are selectively attracted to and retained on the surface of an adsorbent material through the process of adsorption.

Adsorption can occur through two primary mechanisms, physisorption and chemisorption. Physisorption (physical adsorption) involves weak, non-specific interactions such as van der Waals forces or hydrogen bonding. It is generally reversible, occurs at relatively low temperatures, and does not involve the formation of chemical bonds between the adsorbate and the adsorbent whereas, chemisorption (chemical adsorption) is characterized by the formation of strong, specific chemical bonds such as covalent or ionic bonds between the adsorbate and active sites on the adsorbent surface.

Aspects of this disclosure are directed to a method of water purification using a nanocomposite of cobalt oxide (CoO), calcium silicate ($CaSiO_3$), and graphitic carbon nitride ($g-C_3N_4$). The nanocomposite material fabricated by the method of the present disclosure achieves a multi-phase crystalline structure with controlled morphology and enhanced structural properties for wastewater treatment.

A method 50 of water purification is described. The method 50, (FIG. 1), at step 52 includes mixing contaminated water consisting of one or more pollutants with a $CoO/CaSiO_3@g-C_3N_4$ nanocomposite (hereafter also referred to as a nanocomposite material) and at step 54 the method 50 includes adsorbing at least a portion of the one or more pollutants from the contaminated water and further at step 56 the method 50 includes removing the nanocomposite material using filtration to form purified water.

Filtration may be performed through any typical means such as gravity filtration, vacuum filtration, centrifugal filtration, pressure filtration, granular media filtration, and membrane filtration, including microfiltration, ultrafiltration, nanofiltration, and reverse osmosis. In a preferred embodiment, removing the nanocomposite material is performed with membrane filtration.

In some embodiments, the contaminants include organic contaminants selected from a polyaromatic hydrocarbon, a halogenated polyaromatic hydrocarbon, a phenol, a halogenated phenol, a furan, a halogenated furan, a dioxine, a halogenated dioxine, a biphenyl, a halogenated phenyl, and an organic dye. In some embodiments, the contaminants include inorganic contaminants selected from a radioactive nuclide, a toxic metal, a heavy metal and a metalloid. In some embodiments, the organic contaminant may be a dye, a phenol, a polycyclic aromatic hydrocarbon, an herbicide, a pesticide, a persistent organic contaminant, or the like.

A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, basic fuchsin aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin"s mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

A pesticide is a substance meant to prevent, destroy, or control pests including, but not limited to algae, bacteria, fungi, plants, insects, mites, snails, rodents, and viruses.

An herbicide (also known as "weedkiller") is a pesticide intended for plants, being a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapirolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, teenazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

The nanocomposite material includes hexagonal metal oxide nanoparticles including a CoO phase and a $CaSiO_3$ phase dispersed on a matrix of g-$C_3N_4$ nanosheets. The hexagonal metal oxide nanoparticles have an average particle diameter in a range from 300 to 500 nm, preferably 340 to 440 nm. In some embodiments, the hexagonal metal oxide nanoparticles have an average particle diameter in a range from 370-410 nm, preferably 371-409 nm, preferably 372-408 nm, preferably 373-407 nm, preferably 374-406 nm, preferably 375-405 nm, preferably 376-404 nm, preferably 377-403 nm, preferably 378-402 nm, preferably 379-401 nm, preferably 380-400 nm, preferably 381-399 nm, preferably 382-398 nm, preferably 383-397 nm, preferably 384-396 nm, preferably 385-395 nm and preferably 386-394 nm.

In some embodiments, the hexagonal metal oxide nanoparticles have an average particle diameter in a range from 380-400 nm, preferably 381-399 nm, preferably 382-398 nm, preferably 383-397 nm, preferably 384-396 nm, preferably 385-395 nm, and preferably 386-394 nm. In some embodiments, the hexagonal metal oxide nanoparticles have an average particle diameter in a range from 382-395 nm, preferably 383-394 nm, preferably 384-393 nm, preferably 385-392 nm and preferably 386-391 nm. In a preferred embodiment, the hexagonal metal oxide nanoparticles have an average particle diameter of 387 nm.

In one or more embodiments, the CoO/$CaSiO_3$@g-$C_3N_4$ nanocomposite material has a mass ratio of the CoO:$CaSiO_3$:g-$C_3N_4$ phases in a range from 0.25-10:0.25-10:0.25-10, preferably 0.5-7.5:0.5-7.5:0.5-7.5, preferably 1-5:1-5:1-5.

The BET hypothesis is the foundation for a useful analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanocomposite may include, but is not limited to, crystalline average pore distribution, bimodal, trimodal, multimodal, narrow, broad, and Gaussian. In a preferred embodiment, the average pore distribution of nanocomposite is unimodal, indicating a single dominant pore size population within the material. This unimodal distribution indicates that the nanocomposites possess a relatively narrow pore size range, resulting in more uniform pore structures and enhancing specific properties such as adsorption capacity, catalytic activity, or surface reactivity.

In some embodiments, the nanocomposite material has a BET surface area of at least 10 square meters per gram ($m^2 \cdot g^{-1}$), preferably at least 20 $m^2 \cdot g^{-1}$, preferably at least 20.5 $m^2 \cdot g^{-1}$, preferably at least 21 $m^2 \cdot g^{-1}$, preferably at least 21.5 $m^2 \cdot g^{-1}$, preferably at least 22 $m^2 \cdot g^{-1}$, preferably at least 22.5 $m^2 \cdot g^{-1}$, preferably at least 23 $m^2 \cdot g^{-1}$, preferably at least 23.5 $m^2 \cdot g^{-1}$, preferably at least 24 $m^2 \cdot g^{-1}$, preferably at least 24.5 $m^2 \cdot g^{-1}$, preferably at least 25 $m^2 \cdot g^{-1}$, preferably at least 25.5 $m^2 \cdot g^{-1}$, preferably at least 26 $m^2 \cdot g^{-1}$, preferably at least 26.5 $m^2 \cdot g^{-1}$, preferably at least 27 $m^2 \cdot g^{-1}$, preferably at least 27.5 $m^2 \cdot g^{-1}$, preferably at least 28 $m^2 \cdot g^{-1}$, preferably at least 28.5 $m^2 \cdot g^{-1}$, preferably at least 29 $m^2 \cdot g^{-1}$, preferably at least 29.5 $m^2 \cdot g^{-1}$, preferably at least 29.6 $m^2 \cdot g^{-1}$, preferably at least 29.7 $m^2 \cdot g^{-1}$, preferably at least 29.8 $m^2 \cdot g^{-1}$, preferably at least 29.9 $m^2 \cdot g^{-1}$, preferably at least 30 $m^2 \cdot g^{-1}$, preferably at least 30.1 $m^2 \cdot g^{-1}$, preferably at least 30.2 $m^2 \cdot g^{-1}$, preferably at least 30.3 $m^2 \cdot g^{-1}$, preferably at least 30.4 $m^2 \cdot g^{-1}$ and preferably at least 30.5 $m^2 \cdot g^{-1}$.

In some embodiments, the nanocomposite material has a BET surface area of at least 25 $m^2 \cdot g^{-1}$, preferably at least 25.5 $m^2 \cdot g^{-1}$, preferably at least 25.6 $m^2 \cdot g^{-1}$, preferably at least 25.7 $m^2 \cdot g^{-1}$, preferably at least 25.8 $m^2 \cdot g^{-1}$, preferably at least 25.9 $m^2 \cdot g^{-1}$, preferably at least 30 $m^2 \cdot g^{-1}$, preferably at least 30.1 $m^2 \cdot g^{-1}$, preferably at least 30.2 $m^2 \cdot g^{-1}$, preferably at least 30.3 $m^2 \cdot g^{-1}$, preferably at least 30.4 $m^2 \cdot g^{-1}$ and preferably at least 30.5 $m^2 \cdot g^{-1}$.

In some embodiments, nanocomposite material has a BET surface area of at least 30 $m^2 \cdot g^{-1}$, preferably at least 30.1 $m^2 \cdot g^{-1}$, preferably at least 30.2 $m^2 \cdot g^{-1}$, preferably at least 30.3 $m^2 \cdot g^{-1}$, preferably at least 30.4 $m^2 \cdot g^{-1}$ and preferably at least 30.5 $m^2 \cdot g^{-1}$. In a preferred embodiment, the nanocomposite material has a BET surface area of 30.68 $m^2 \cdot g^{-1}$.

In some embodiments, the nanocomposite material has a pore volume of at least 0.05 $cm^3 \cdot g^{-1}$, preferably at least 0.10 $cm^3 \cdot g^{-1}$, preferably at least 0.11 $cm^3 \cdot g^{-1}$, preferably at least 0.12 $cm^3 \cdot g^{-1}$, preferably at least 0.13 $cm^3 \cdot g^{-1}$, preferably at least 0.14 $cm^3 \cdot g^{-1}$, preferably at least 0.15 $cm^3 \cdot g^{-1}$, preferably at least 0.16 $cm^3 \cdot g^{-1}$, preferably at least 0.17 $cm^3 \cdot g^{-1}$, preferably at least 0.18 $cm^3 \cdot g^{-1}$, preferably at least 0.19 $cm^3 \cdot g^{-1}$, preferably at least 0.191 $cm^3 \cdot g^{-1}$, preferably at least 0.192 $cm^3 \cdot g^{-1}$, preferably at least 0.193 $cm^3 \cdot g^{-1}$, preferably at least 0.194 $cm^3 \cdot g^{-1}$ and preferably at least 0.195 $cm^3 \cdot g^{-1}$ In some embodiments, the nanocomposite material has a pore volume of at least 0.15 $cm^3 \cdot g^{-1}$, preferably at least 0.152 $cm^3 \cdot g^{-1}$, preferably at least 0.156 $cm^3 \cdot g^{-1}$, preferably at least 0.158 $cm^3 \cdot g^{-1}$, preferably at least 0.160 $cm^3 \cdot g^{-1}$, preferably at least 0.162 $cm^3 \cdot g^{-1}$, preferably at least 0.164 $cm^3 \cdot g^{-1}$, preferably at least 0.166 $cm^3 \cdot g^{-1}$, preferably at least 0.168 $cm^3 \cdot g^{-1}$, preferably at least 0.17 $cm^3 \cdot g^{-1}$, preferably at least 0.172 $cm^3 \cdot g^{-1}$, preferably at least 0.174 $cm^3 \cdot g^{-1}$, preferably at least 0.176 $cm^3 \cdot g^{-1}$, preferably at least 0.178 $cm^3 \cdot g^{-1}$, preferably at least 0.18 $cm^3 \cdot g^{-1}$, preferably at least 0.182 $cm^3 \cdot g^{-1}$, preferably at least 0.184 $cm^3 \cdot g^{-1}$, preferably at least 0.186 $cm^3 \cdot g^{-1}$, preferably at least 0.188 $cm^3 \cdot g^{-1}$, preferably at least 0.19 $cm^3 \cdot g^{-1}$, preferably at least 0.191 $cm^3 \cdot g^{-1}$, preferably at least 0.192 $cm^3 \cdot g^{-1}$, preferably at least 0.193 $cm^3 \cdot g^{-1}$, preferably at least 0.194 $cm^3 \cdot g^{-1}$ and preferably at least 0.195 $cm^3 \cdot g^{-1}$. In a preferred embodiment, the nanocomposite material has a pore volume of at least 0.195 $cm^3 \cdot g^{-1}$.

In some embodiments, the nanocomposite material has an average pore diameter in a range from 5-45 nm, preferably 10-30 nm, preferably 11-29.9 nm, preferably 11.5-29.8 nm, preferably 12-29.7 nm, preferably 12.5-29.6 nm, preferably 13-29.5 nm, preferably 13.5-29.4 nm, preferably 14-29.3 nm, preferably 14.5-29.2 nm, preferably 15-29.1 nm, preferably 15.5-29.0 nm, preferably 16-28.9 nm, preferably 16.5-28.8 nm, preferably 17-28.7 nm, preferably 17.5-28.6 nm, preferably 18-28.5 nm, preferably 18-28.4 nm, preferably 18-28.3 nm, preferably 18-28.2 nm, preferably 18-28.1 nm, preferably 18-28 nm and preferably 18-27 nm.

In some embodiments, the nanocomposite material has an average pore diameter in a range from 15-27 nm, preferably 15.1-26.9 nm, preferably 15.3-26.7 nm, preferably 15.5-26.5 nm, preferably 15.7-26.3 nm, preferably 15.9-26.1 nm, preferably 16.1-25.9 nm, preferably 16.3-25.7 nm, preferably 16.5-25.5 nm, preferably 16.7-25.3 nm, preferably 16.9-25.1 nm, preferably 17.1-24.9 nm, preferably 17.3-24.7 nm, preferably 17.5-24.5 nm, preferably 17.7-24.3 nm, preferably 17.9-24.1 nm, preferably 18.1-23.9 nm, preferably 18.3-23.7 nm, preferably 18.5-23.5 nm, preferably 18.7-23.3 nm, preferably 18.9-23.1 nm, preferably 19.1-22.9 nm, preferably 19.3-22.7 nm, preferably 19.5-22.5 nm, preferably 19.7-22.5 nm, preferably 19.9-22.5 nm and preferably 20.1-22.5 nm. In a preferred embodiment, the nanocomposite material has an average pore diameter of 21.82 nm.

In some embodiments, the nanocomposite material has an absorption capacity for basic fuchsin (BF) of at least 10 milligrams per gram (mg/g), preferably at least 20 mg/g, preferably at least 22 mg/g, preferably at least 24 mg/g, preferably at least 26 mg/g, preferably at least 28 mg/g, preferably at least 30 mg/g, preferably at least 32 mg/g, preferably at least 34 mg/g, preferably at least 36 mg/g, preferably at least 38 mg/g and preferably at least 40 mg/g.

In some embodiments, the nanocomposite material has an absorption capacity for BF of at least 25 mg/g, preferably at least 26 mg/g, preferably at least 27 mg/g, preferably at least 28 mg/g, preferably at least 29 mg/g, preferably at least 30 mg/g, preferably at least 31 mg/g, preferably at least 32 mg/g, preferably at least 33 mg/g, preferably at least 34 mg/g, preferably at least 35 mg/g, preferably at least 36 mg/g, preferably at least 37 mg/g, preferably at least 38 mg/g, preferably at least 39 mg/g, preferably at least 40 mg/g, preferably at least 40.1 mg/g, preferably at least 40.2 mg/g, preferably at least 40.3 mg/g, preferably at least 40.4 mg/g, preferably at least 40.5 mg/g, preferably at least 40.6 mg/g and preferably at least 40.7 mg/g.

In some embodiments, the nanocomposite material has an absorption capacity for BF of at least 30 mg/g, preferably at least 30.1 mg/g, preferably at least 30.2 mg/g, preferably at least 30.3 mg/g, preferably at least 30.4 mg/g, preferably at least 30.5 mg/g, preferably at least 30.6 mg/g, preferably at least 30.7 mg/g, preferably at least 30.8 mg/g, preferably at least 30.9 mg/g, preferably at least 40 mg/g, preferably at least 40.1 mg/g, preferably at least 40.2 mg/g, preferably at least 40.3 mg/g, preferably at least 40.4 mg/g, preferably at least 40.5 mg/g, preferably at least 40.6 mg/g and preferably at least 40.7 mg/g.

In some embodiments, the nanocomposite material has an absorption capacity for BF of at least 35 mg/g, preferably at least 35.1 mg/g, preferably at least 35.2 mg/g, preferably at least 35.3 mg/g, preferably at least 35.4 mg/g, preferably at least 35.5 mg/g, preferably at least 35.6 mg/g, preferably at least 35.7 mg/g, preferably at least 35.8 mg/g, preferably at least 35.9 mg/g, preferably at least 36 mg/g, preferably at least 36.1 mg/g, preferably at least 36.2 mg/g, preferably at least 36.3 mg/g, preferably at least 36.4 mg/g, preferably at least 36.5 mg/g, preferably at least 36.6 mg/g, preferably at least 36.7 mg/g, preferably at least 36.8 mg/g, preferably at least 36.9 mg/g, preferably at least 37 mg/g, preferably at least 37.1 mg/g, preferably at least 37.2 mg/g, preferably at least 37.3 mg/g, preferably at least 37.4 mg/g, preferably at least 37.5 mg/g, preferably at least 37.6 mg/g, preferably at least 37.7 mg/g, preferably at least 37.8 mg/g, preferably at least 38.9 mg/g, preferably at least 39 mg/g, preferably at least 39.1 mg/g, preferably at least 39.2 mg/g, preferably at least 39.3 mg/g, preferably at least 39.4 mg/g, preferably at least 39.5 mg/g, preferably at least 39.6 mg/g, preferably at least 39.7 mg/g, preferably at least 39.8 mg/g, preferably at least 39.9 mg/g, preferably at least 40 mg/g, preferably at least 40.1 mg/g, preferably at least 40.2 mg/g, preferably at least 40.3 mg/g, preferably at least 40.4 mg/g, preferably at least 40.5 mg/g, preferably at least 40.6 mg/g and preferably at least 40.7 mg/g.

In some embodiments, the nanocomposite material has an absorption capacity for BF of at least 40 mg/g, preferably at least 40.1 mg/g, preferably at least 40.2 mg/g, preferably at least 40.3 mg/g, preferably at least 40.4 mg/g, preferably at least 40.5 mg/g, preferably at least 40.6 mg/g and preferably at least 40.7 mg/g. In a preferred embodiment, the nano-composite material has an absorption capacity for basic fuchsin of 40.8 mg/g.

EXAMPLES

The following examples demonstrates a cobalt oxide/calcium silicate@graphitic carbon nitride (CoO/CaSiO$_3$@g-C$_3$N$_4$) nanocomposite material and method of preparation thereof. The examples are provided solely for illustration and are not to be construed as limitations of the present disclosure, as many variations thereof are possible without departing from the spirit and scope of the present disclosure.

Example 1: Fabricating the CaSiO$_3$

Equal moles of calcium nitrate (0.5 g) and sodium meta-silicate (0.37 g) were dispersed in 100 milliliters (mL) of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 mL distilled water with an ultrasonic bath for 10 minutes, filtered via a Buchner system, rinsed with distilled water, and dried at 120° C. for 1 hour.

Example 2: Fabricating the g-C$_3$N$_4$

About 30 grams (g) of urea (NH$_2$CONH$_2$) was placed in a 250 milliliters (mL) porcelain crucible and covered with its porcelain cover, then the crucible and cover were wrapped with three layers of aluminum foil to reduce the NH$_2$CONH$_2$ loss to sublimation. The crucible was heated via a furnace set at 600° C. for 45 min.

Example 3: Fabricating the CoO

About 10 g of cobalt (II) acetate (C$_4$H$_6$CoO$_4$) and 5 g of xylose (C$_5$H$_{10}$O$_5$) were placed in a 500 mL beaker. 100 mL distilled water was added to the mixture and heated until a clear solution was obtained. 10 mL of concentrated nitric acid (HNO$_3$) was added to the mixture, which was then heated until the carbonization of C$_5$H$_{10}$O$_5$. The mixture was placed in an oven set at 120° C. for 3 h; the black product was milled in a mortar, placed in a 150 mL porcelain dish, and calcined at 550° C. for 4 h.

Example 4: Fabricating the CoO/CaSiO$_3$@g-C$_3$N$_4$

An equal amount of calcium silicate (CaSiO$_3$), graphitic carbon nitride (g-C$_3$N$_4$), and cobalt oxide (CoO) (0.5 grams each) was transferred to a mono wave-200 vial (G30), dispersed in 20 mL ethylene glycol monomethyl ether via an ultrasonic bath for 30 min. The vial was closed with its teflon cover and placed in the Anton-Baar Monowave-200 operated at 180° C. and 5 bar pressure for one hour. The product was dispersed in 1 L distilled water with an ultrasonic bath for 30 min, filtered via a Buchner system, rinsed with distilled water, and dried at 150° C. for 2 h.

The crystallinity and phase composition of the CoO/CaSiO$_3$@g-C$_3$N$_4$ catalyst were examined using X-ray diffraction (XRD), as presented in FIG. 1. The presence of sharp peaks with high intensity values indicates the highly crystalline nature of the nanocomposite. Based on an analysis of the diffraction patterns using standard JCPDS reference cards, CoO was identified as the primary phase, with CaSiO$_3$ and g-C$_3$N$_4$ present as minor phases. The prominent peaks observed at 2θ values of 36.5°, 42.4°, 61.5°, 73.6° and 77.5° correspond to the (111), (200), (220), (311) and (222) planes of the cubic CoO phase (Reference code No. 01-071-1178). Weak diffraction peaks at 2θ values of 27.6° and 28.9° were attributed to the CaSiO$_3$ phase (Reference code No. 01-084-0655), while a trace amount of quartz (SiO$_2$) was detected at 27.3° (Reference code No. 01-079-1911). The diffraction peak corresponding to g-C$_3$N$_4$ was observed at 61.4° (Reference code No. 01-087-1526). The absence of additional phases confirms the successful fabrication of the CoO/CaSiO$_3$@g-C$_3$N$_4$ composite.

Figure 2:
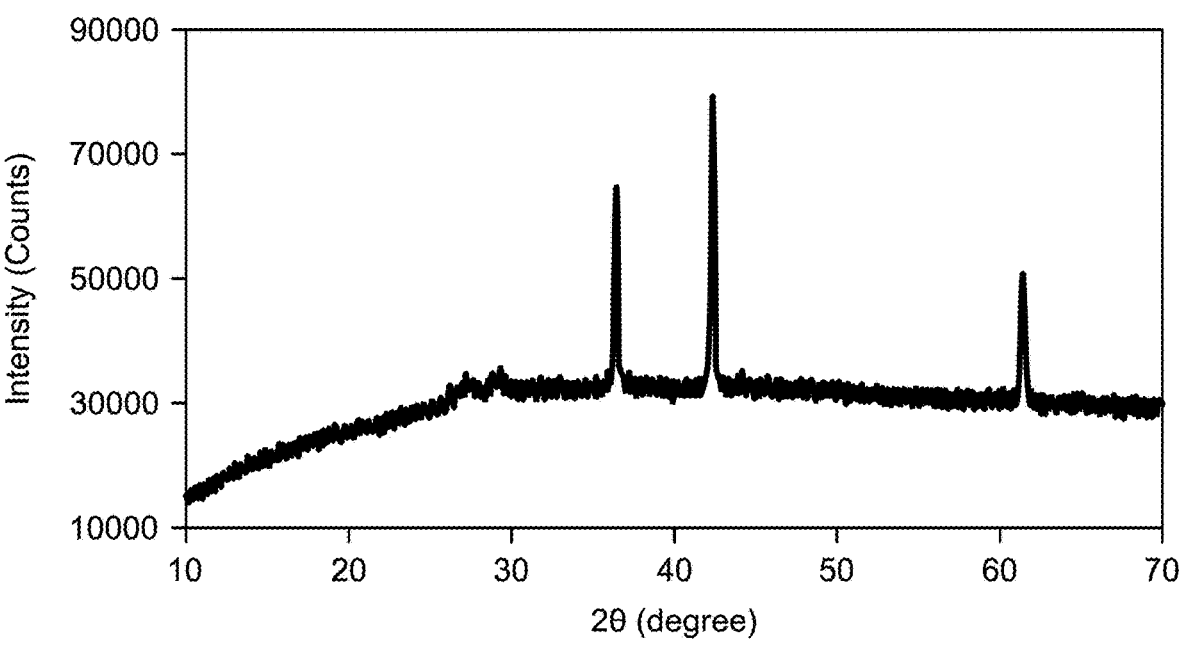
FIG. 2 shows X-ray diffraction (XRD) diffractogram of $CoO/CaSiO_3@g-C_3N_4$ nanocomposite, according to certain embodiments.

FIG. 2A shows the transmission electron microscopy (TEM) images illustrating the morphological features and nanoscale structure of the CoO/CaSiO$_3$@g-C$_3$N$_4$ nanocomposite. The TEM image reveals a two-dimensional porous structure composed of curled and wrinkled nanosheets, along with platelets of g-C$_3$N$_4$. The image also demonstrates the well-dispersed, homogeneously distributed hexagonal-shaped metal oxide nanoparticles on the g-C$_3$N$_4$ nanosheets, with an average particle size of approximately 387 nano-meters (nm). The corresponding selected area electron diffraction (SAED) pattern, shown in FIG. 2B, reveals diffraction spots with interplanar spacing of 0.288 nm, 0.256 nm and 0.186 nm, 0.142 nm due to (CaSiO$_3$: 131), (CoO: 111, CaSiO$_3$: 022), (CaSiO$_3$: −2-32), and (CoO: 220, CaSiO$_3$: −330, g-C$_3$N$_4$; 221) diffraction planes.

Figure 3A:
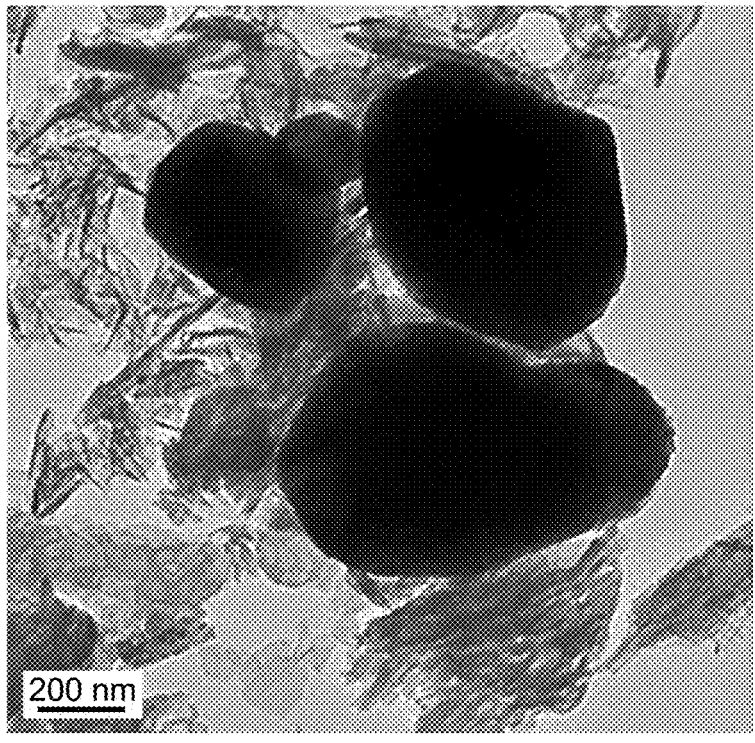
FIG. 3A shows transmission electron microscopy (TEM) image of the $CoO/CaSiO_3@g-C_3N_4$ nanocomposite, according to certain embodiments.
Figure 3B:
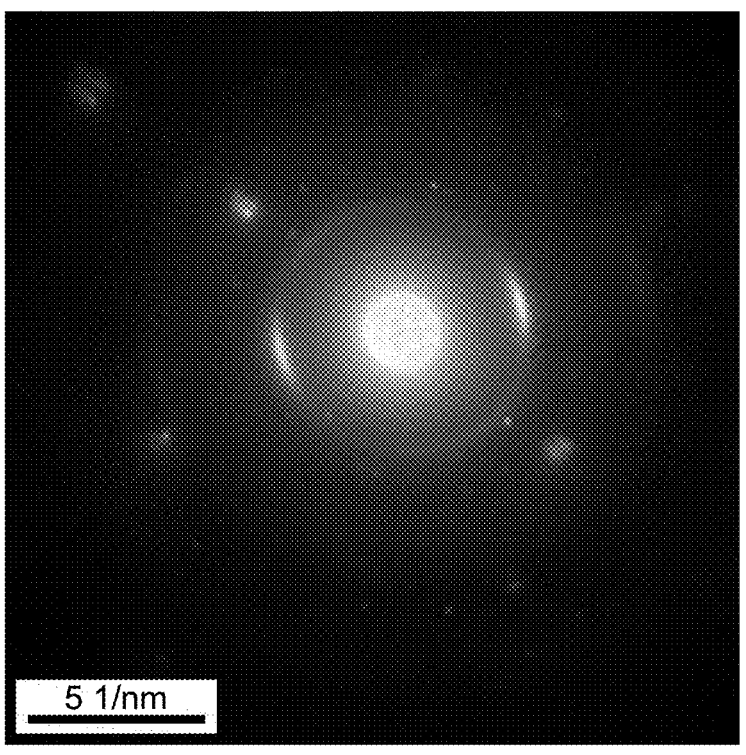
FIG. 3B shows selected area electron diffraction (SAED) pattern of the $CoO/CaSiO_3@g-C_3N_4$ nanocomposite, according to certain embodiments.

FIG. 3 displays the nitrogen adsorption-desorption isotherms of CoO/CaSiO$_3$@g-C$_3$N$_4$ nanocomposite. The nitrogen sorption isotherm of the composite belongs to type IV with a noticeable hysteresis loop, indicating the formation of mesoporous structures. However, shifting the loop to a relatively higher pressure (P/P$_0$=0.66-1) indicates the presence of wide mesopores, which may result from the deposition of metal oxide particles in the wide pores of g-C$_3$N$_4$. Furthermore, the Brunauer-Emmett-Teller (BET) surface area of the CoO/CaSiO$_3$@g-C$_3$N$_4$ sample was calculated to be 30.68 square meters per gram (m$^2$ g$^{-1}$). The high specific surface area reflects the good dispersion of these metal oxide nanoparticles on g-C$_3$N$_4$. Moreover, the pore size distribution curves, plotted using the Barrett-Joyner-Halenda (BJH) method, for the nanocomposite exhibited unimodal distribution with average pore diameters maximized at 21.82 nm and a pore volume of 0.198 cubic centimeters per gram (cm$^3$ g$^{-1}$). All the isotherms belong to the H3 pores category, which do not exhibit limiting adsorption at high $P/P_0$, and arise due to aggregation of plate-like particles giving rise to slit-shaped pores. This indicates that the assembly of the nanocomposite produced a mesoporous array.

For adsorption studies, 0.05 g of sorbent was added in separate 150 mL beakers. 100 mL of the 100 mg L$^{-1}$ basic fuchsin (BF) solution was then poured into each beaker. A portion of the mixture was withdrawn until the BF sorption reached equilibrium. The aliquots were filtered via a 0.22 micrometer (m) syringe filter, and the absorbance was measured utilizing a UV-Vis-spectrophotometer ($\lambda$=550 nm).

The contact time study of BF and sorption onto the as-prepared nanocomposite was studied and absorbances measured during the study were employed for calculating their remaining concentrations (unadsorbed) at each time interval via equation 1. Equation 2 was utilized to calculate the adsorption capacity at each period (the BF or milligrams adsorbed onto one gram of sorbent, $q_t$, mg g$^{-1}$).

$$C_t = \frac{\text{Absorbance}_{sample}}{\text{Absorbance}_{standard}} \times conc._{standard} \quad (1)$$

$$q_t = \frac{(C_o - C_t)V}{m} \quad (2)$$

Figure 4A:
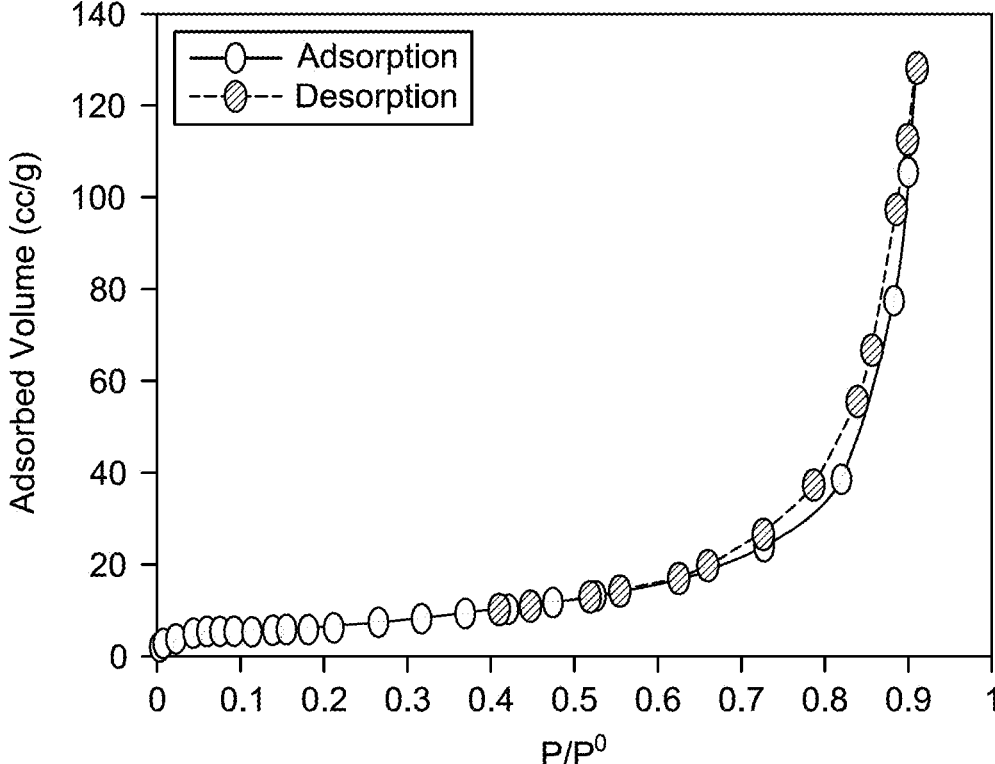
FIG. 4A is a graph depicting nitrogen ($N_2$) adsorption-desorption isotherms of the $CoO/CaSiO_3@g-C_3N_4$ nanocomposite, according to certain embodiments.
Figure 4B:
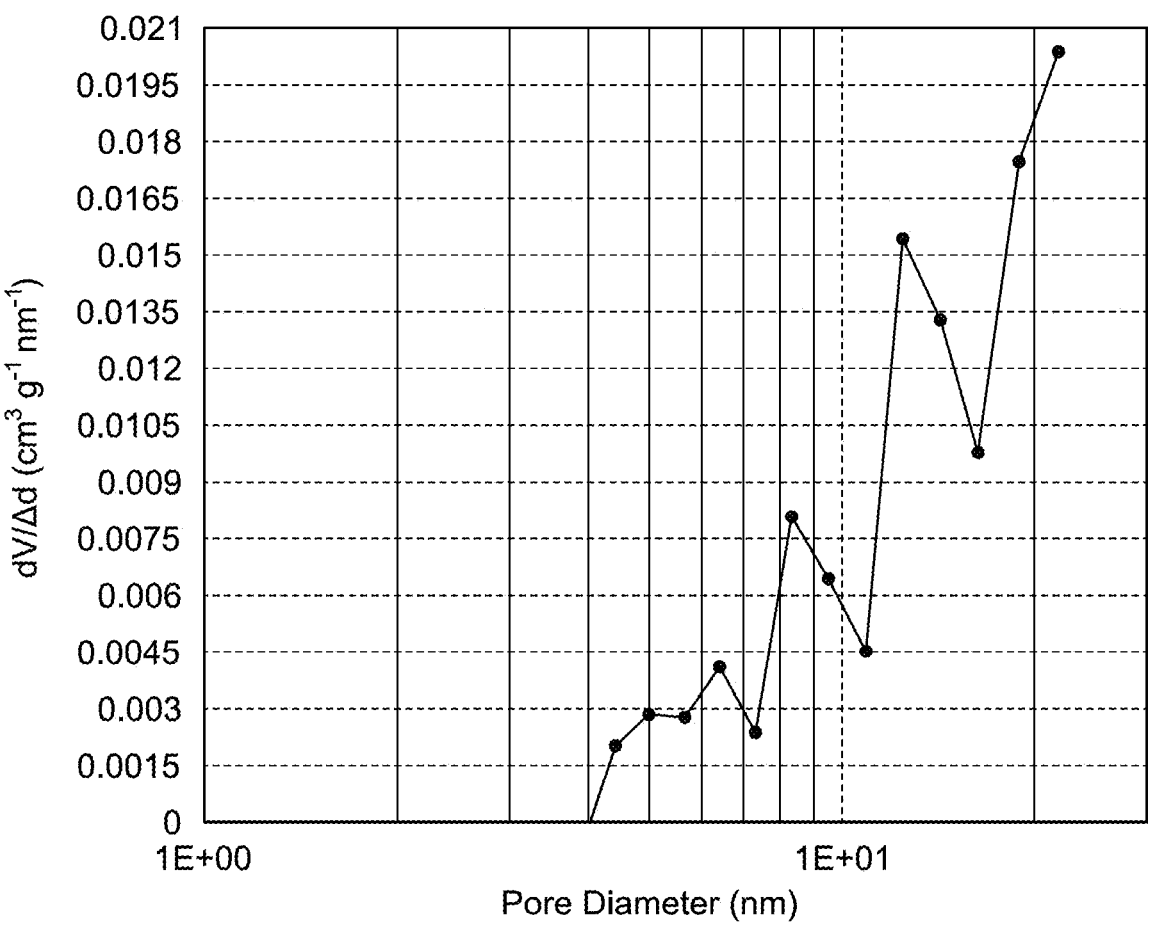
FIG. 4B is a graph depicting pore size distribution curve of the $CoO/CaSiO_3@g-C_3N_4$ nanocomposite, according to certain embodiments.

FIG. 4 demonstrates the adsorption trend of BF onto the prepared nanocomposite. The nanocomposite showed $q_t$ values of 40.8 milligrams per gram (mg/g). These results reflected the capability of the nanocomposite for treating water contaminated by organic pollutants. Notably, almost 90% of the gained $q_t$ value was acquired within the first 30 minutes (min), and the overall sorption processes reached equilibrium within 90 min, presenting the nanocomposite as a fast treatment sorbent.

Further, the adsorption rate order of BF removal by the prepared nanocomposite was studied via pseudo-first-order (PF, Equation 3) and pseudo-second-order (PS, Equation 4) kinetic models.

$$\ln (q_e - q_t) = \ln q_e - k_1 \cdot t \quad (3)$$

$$\frac{1}{q_t} = \frac{1}{k_2 \cdot q_e^2 t} + \frac{1}{q_e} \quad (4)$$

Figure 5:
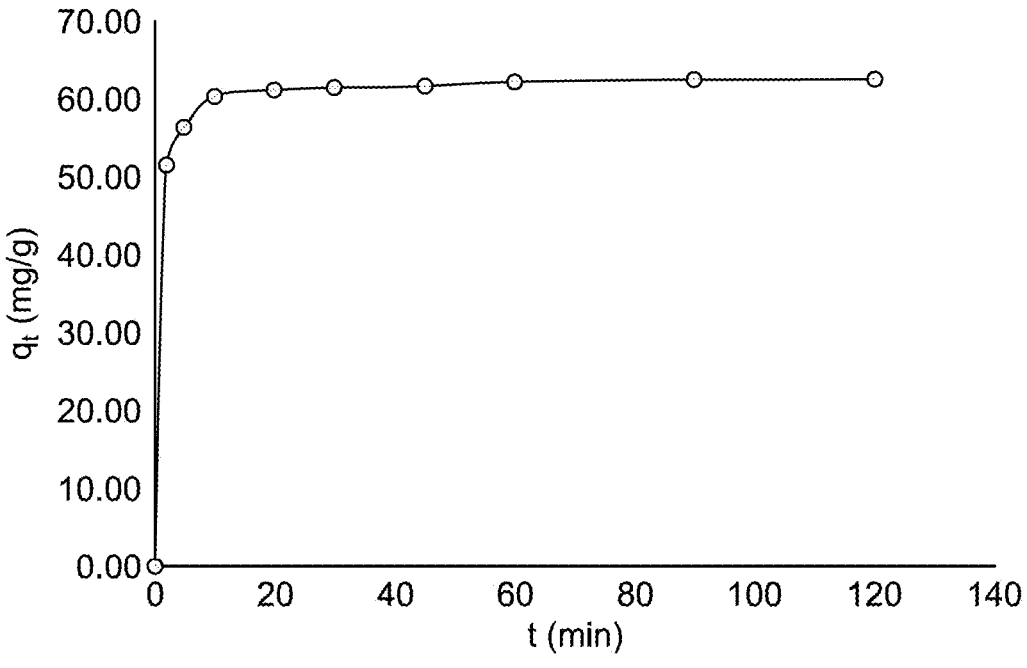
FIG. 5 is a graph depicting contact time investigation of basic fuchsin (BF) sorption onto $CoO/CaSiO_3@g-C_3N_4$ nanocomposite, according to certain embodiments.
Figure 6:
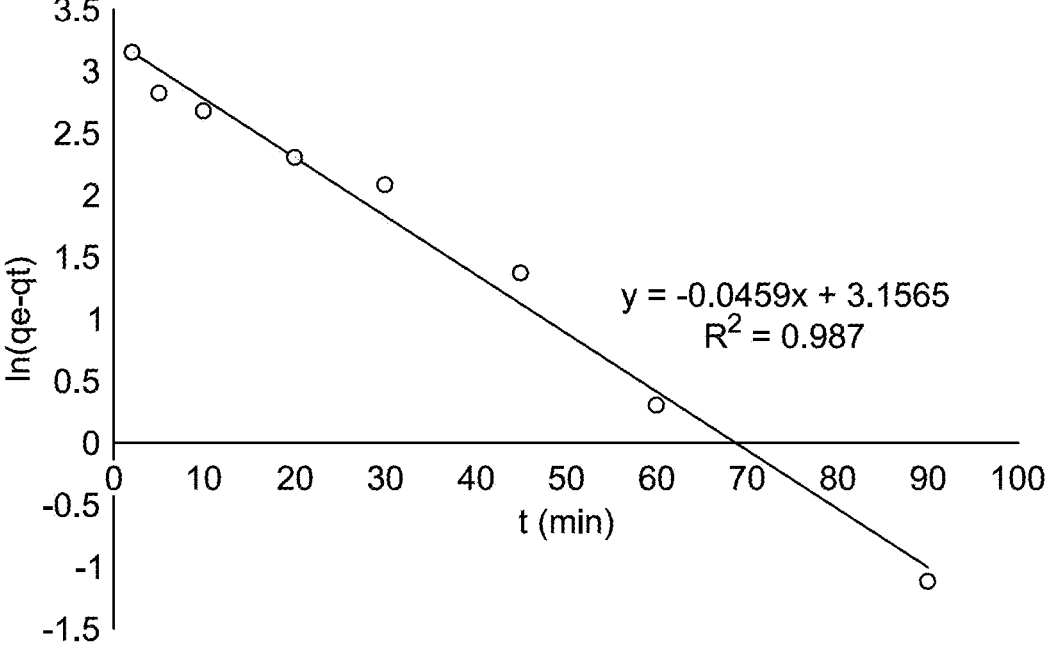
FIG. 6 is a graph depicting pseudo-first order (PF) investigation of BF sorption onto $CoO/CaSiO_3@g-C_3N_4$ nanocomposite, according to certain embodiments.

The symbol $q_e$ (mg/g) represents the equilibrium adsorption capacity. The PF and PS constants are also time-dependent, with the former represented as $k_1$ (min$^{-1}$) and the latter as $k_2$ (g mg$^{-1}$min$^{-1}$). The PF plot of the BF adsorption onto the nanocomposite is depicted in FIG. 5. Additionally, FIG. 6 illustrates the PS plots of BF sorption onto the nanocomposite. The rate-order output of BF removal illustrated that the sorption on the nanocomposite showed better fitting to the PF model.

Further, the rate-control mechanism of BF removal by the nanocomposite was studied using the intraparticle (IPD, Equation 5) and the liquid-film (LFD, Equation 6) diffusion model.

$$q_t = K_{IPD} * t^{\frac{1}{2}} + C_i \quad (5)$$

$$\ln(1 - F) = -K_{LFD} * t \quad (6)$$

Figure 7:
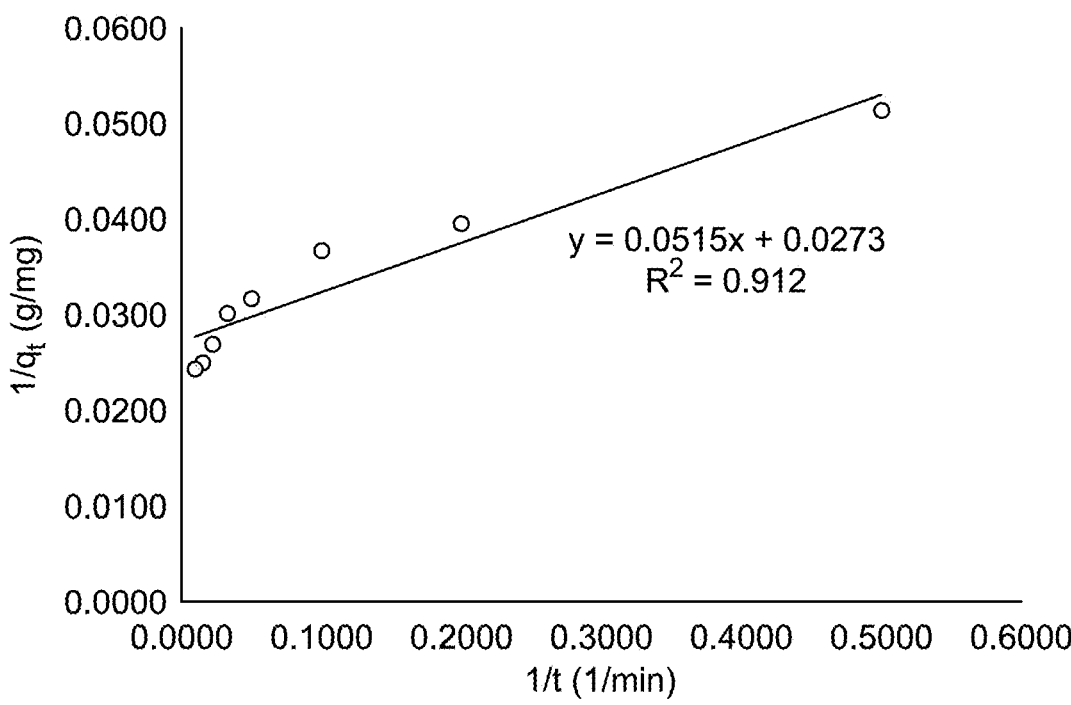
FIG. 7 is a graph depicting pseudo-second order (PS) investigation of BF sorption onto $CoO/CaSiO_3@g-C_3N_4$ nanocomposite, according to certain embodiments.
Figure 8:
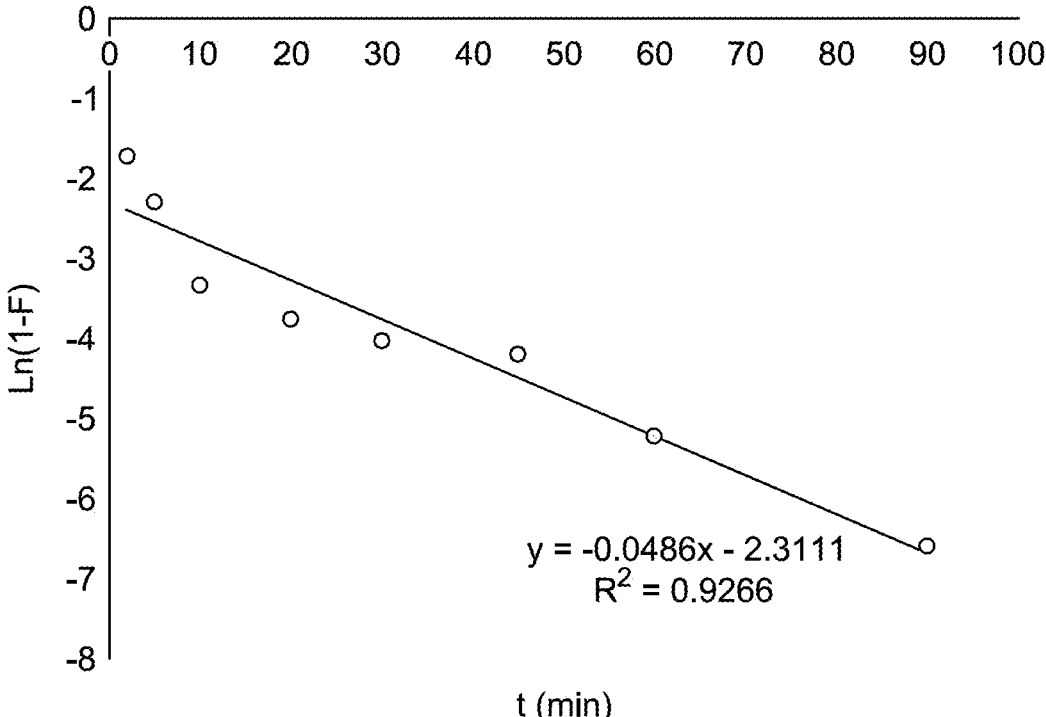
FIG. 8 is a graph depicting liquid-film diffusion model (LFD) investigation of BF sorption onto $CoO/CaSiO_3@g-C_3N_4$ nanocomposite, according to certain embodiments.
Figure 9:
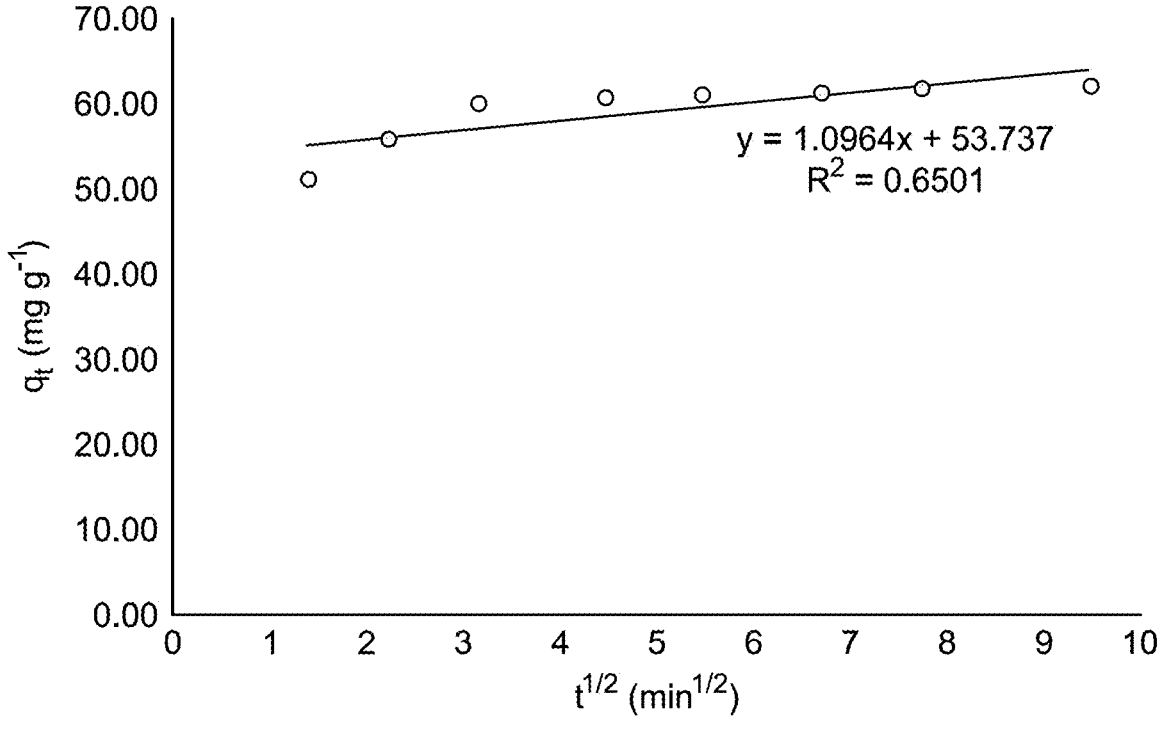
FIG. 9 is a graph depicting intraparticle diffusion model (IPD) investigation of BF sorption onto $CoO/CaSiO_3@g-C_3N_4$ nanocomposite, according to certain embodiments.

The IPD constant is denoted by $K_{IPD}$ (mg g$^{-1}$ min$^{-1/2}$), and the LFD constant is designated by $K_{LFD}$ (min$^{-1}$). $C_i$: the boundary layer factor, expressed as milligram per gram (mg g$^{-1}$), and F is the fractional attainment of equilibrium. The LFD plot of the BF adsorption onto the nanocomposite is depicted in FIG. 7. Additionally, FIG. 8 illustrates the IPD plots of BF sorption onto the nanocomposite. The rate-control output of BF removal illustrated that the IP model best represents the sorption on the fabricated nanocomposite.

To conclude, the synthesized CoO/CaSiO$_3$@g-C$_3$N$_4$ nanocomposite demonstrated excellent structural and adsorption properties, as evidenced by its high crystallinity, mesoporous structure, and well-dispersed hexagonal metal oxide nanoparticles. The nanocomposite exhibited a large surface area and favorable pore characteristics contributing to its high adsorption capacity for basic fuchsin (BF) dye. Kinetic studies revealed that the adsorption process followed a pseudo-first-order model, while diffusion studies indicated intraparticle diffusion as the primary rate-limiting step.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of water purification, comprising:
   mixing contaminated water comprising one or more pollutants with a cobalt oxide/calcium silicate @graphitic carbon nitride (CoO/CaSiO$_3$@g-C$_3$N$_4$) nanocomposite material;
   adsorbing at least a portion of the one or more pollutants onto the CoO/CaSiO$_3$@g-C$_3$N$_4$ nanocomposite material from the contaminated water; and
   removing the CoO/CaSiO$_3$@g-C$_3$N$_4$ nanocomposite material using filtration to form purified water,
   wherein the CoO/CaSiO$_3$@g-C$_3$N$_4$ nanocomposite material comprises hexagonal metal oxide nanoparticles comprising a CoO phase and a CaSiO$_3$ phase dispersed on a matrix of g-C$_3$N$_4$ nanosheets,
   wherein the hexagonal metal oxide nanoparticles have an average particle diameter in a range from 340 to 440 nanometer (nm),
   wherein the CoO/CaSiO$_3$@g-C$_3$N$_4$ nanocomposite material has an absorption capacity for basic fuchsin (BF) of at least 20 milligram per gram (mg/g),
   wherein the CoO/CaSiO$_3$@g-C$_3$N$_4$ nanocomposite material has unimodal pore distribution and an average pore diameter in a range from 10 to 30 nm, and
   wherein the CoO/CaSiO$_3$@g-C$_3$N$_4$ nanocomposite material has a mass ratio of CoO:CaSiO$_3$:g-C$_3$N$_4$ phases in a range from 1-2:1-2:2-6.

2. The method of claim 1, wherein the CoO/CaSiO$_3$@g-C$_3$N$_4$ nanocomposite material has an absorption capacity for BF of at least 25 mg/g.

3. The method of claim 2, wherein the CoO/CaSiO$_3$@g-C$_3$N$_4$ nanocomposite material has an absorption capacity for BF of at least 30 mg/g.

4. The method of claim 3, wherein the CoO/CaSiO$_3$@g-C$_3$N$_4$ nanocomposite material has an absorption capacity for BF of at least 35 mg/g.

5. The method of claim 4, wherein the CoO/CaSiO$_3$@g-C$_3$N$_4$ nanocomposite material has an absorption capacity for BF of at least 40 mg/g.

6. The method of claim 5, wherein the CoO/CaSiO$_3$@g-C$_3$N$_4$ nanocomposite material has an absorption capacity for BF of 40.8 mg/g.

7. The method of claim 1, wherein the hexagonal metal oxide nanoparticles have an average particle diameter in a range from 370 to 410 nm.

8. The method of claim 7, wherein the hexagonal metal oxide nanoparticles have an average particle diameter in a range from 380 to 400 nm.

9. The method of claim 8, wherein the hexagonal metal oxide nanoparticles have an average particle diameter in a range from 382 to 395 nm.

10. The method of claim 1, wherein the $CoO/CaSiO_3@g\text{-}C_3N_4$ nanocomposite material has a Brunauer-Emmett-Teller (BET) surface area of at least 20 square meters per gram ($m^2 \cdot g^{-1}$).

11. The method of claim 10, wherein the $CoO/CaSiO_3@g\text{-}C_3N_4$ nanocomposite material has a BET surface area of at least 25 $m^2 \cdot g^{-1}$.

12. The method of claim 11, wherein the $CoO/CaSiO_3@g\text{-}C_3N_4$ nanocomposite material has a BET surface area of at least 30 $m^2 \cdot g^{-1}$.

13. The method of claim 12, wherein the $CoO/CaSiO_3@g\text{-}C_3N_4$ nanocomposite material has a BET surface area of 30.68 $m^2 \cdot g^{-1}$.

14. The method of claim 1, wherein the $CoO/CaSiO_3@g\text{-}C_3N_4$ nanocomposite material has a pore volume of at least 0.10 cubic centimeters per gram ($cm^3 \cdot g^{-1}$).

15. The method of claim 14, wherein the $CoO/CaSiO_3@g\text{-}C_3N_4$ nanocomposite material has a pore volume of at least 0.15 $cm^3 \cdot g^{-1}$.

16. The method of claim 15, wherein the $CoO/CaSiO_3@g\text{-}C_3N_4$ nanocomposite material has a pore volume of at least 0.195 $cm^3 \cdot g^{-1}$.

17. The method of claim 1, wherein the $CoO/CaSiO_3@g\text{-}C_3N_4$ nanocomposite material has an average pore diameter in a range from 15 to 27 nm.

18. The method of claim 17, wherein the $CoO/CaSiO_3@g\text{-}C_3N_4$ nanocomposite material has an average pore diameter of 21.82 nm.

\* \* \* \* \*